United States Patent
Tang et al.

(10) Patent No.: US 10,958,120 B2
(45) Date of Patent: Mar. 23, 2021

(54) ELECTRIC MACHINE ROTOR FOR HARMONIC FLUX REDUCTION

(71) Applicant: Ford Global Technologies, LLC, Dearborn, MI (US)

(72) Inventors: Chun Tang, Canton, MI (US); Feng Liang, Troy, MI (US); Wei Wu, Northville, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 670 days.

(21) Appl. No.: 15/710,073

(22) Filed: Sep. 20, 2017

(65) Prior Publication Data

US 2019/0089214 A1 Mar. 21, 2019

(51) Int. Cl.
*H02K 1/27* (2006.01)
*H02K 29/03* (2006.01)

(52) U.S. Cl.
CPC ........... *H02K 1/2766* (2013.01); *H02K 29/03* (2013.01)

(58) Field of Classification Search
CPC ......... H02K 1/2766; H02K 1/276; H02K 1/27

USPC ........................................ 310/156.53, 156.46
See application file for complete search history.

(56) References Cited

U.S. PATENT DOCUMENTS

| | | | |
|---|---|---|---|
| 6,525,442 B2* | 2/2003 | Koharagi | H02K 1/2766 310/156.45 |
| 7,612,480 B2 | 11/2009 | Fujii et al. | |
| 9,236,775 B2 | 1/2016 | Takahashi et al. | |
| 2010/0213780 A1* | 8/2010 | Lee | H02K 1/2766 310/156.53 |
| 2011/0133590 A1* | 6/2011 | Lokhandwalla | H02K 1/2766 310/156.53 |
| 2012/0139378 A1* | 6/2012 | Endo | H02K 1/28 310/156.21 |
| 2014/0217849 A1 | 8/2014 | Soma et al. | |

* cited by examiner

*Primary Examiner* — Nguyen Tran
(74) *Attorney, Agent, or Firm* — David Kelley; Brooks Kushman, P.C.

(57) ABSTRACT

A permanent magnet machine is provided. The permanent magnet machine may include a plurality of laminations stacked to form a rotor. Each of the laminations may define a d-axis, and first and second, recessed notches on an outer circumference. The first and second recessed notches may be disposed at ±180/N electrical degrees with respect to the d-axis. N may be a multiple of 6.

9 Claims, 7 Drawing Sheets

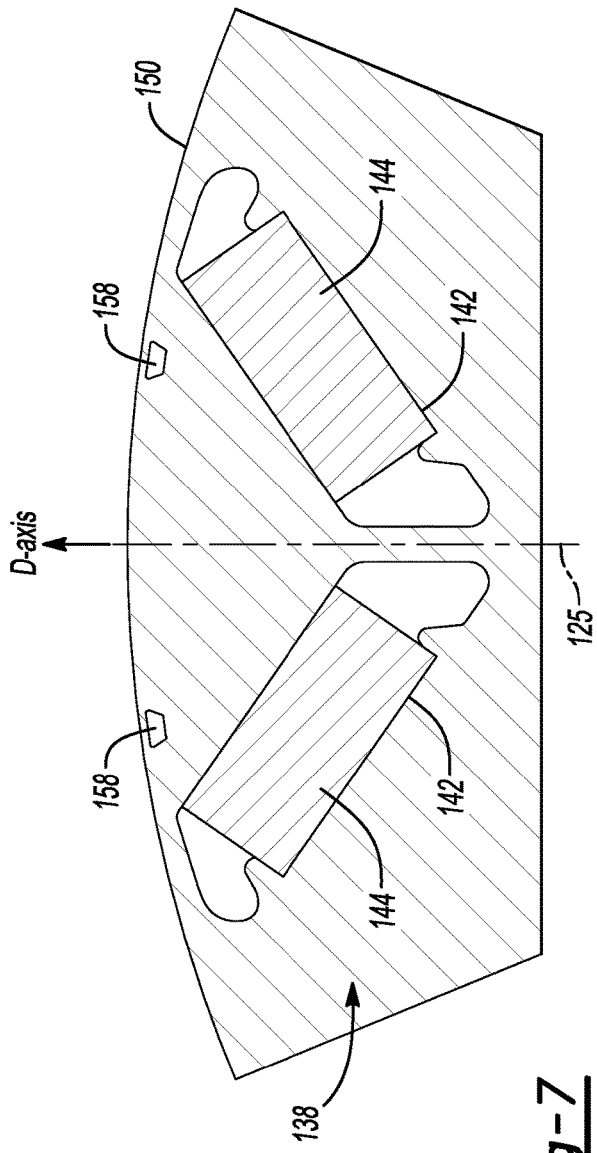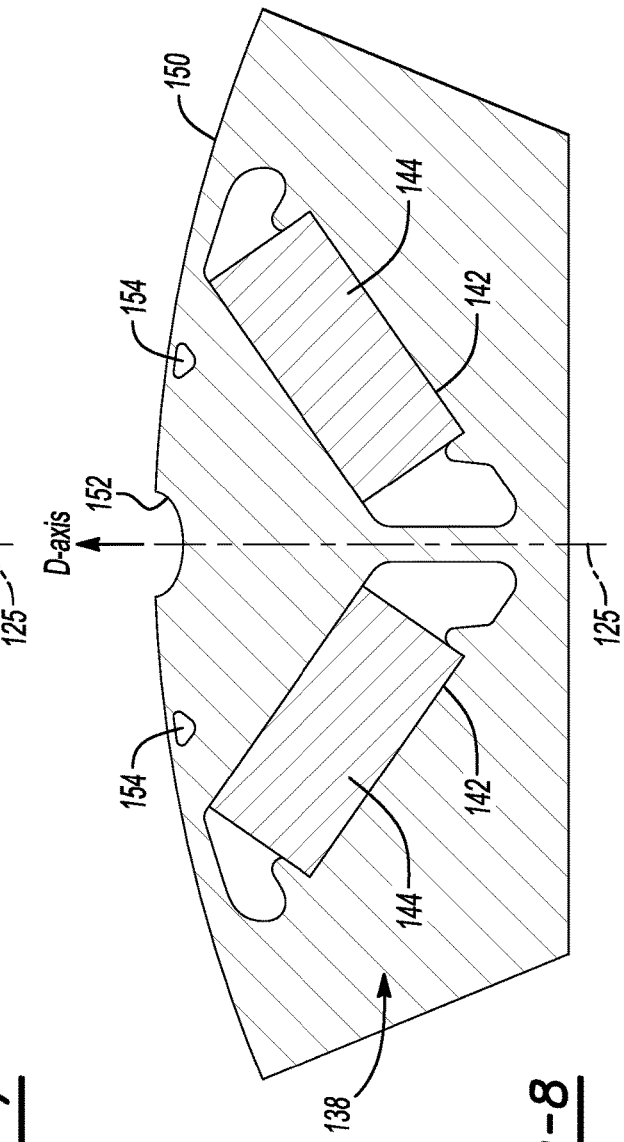

US 10,958,120 B2

ELECTRIC MACHINE ROTOR FOR HARMONIC FLUX REDUCTION

TECHNICAL FIELD

This application generally relates to surface groove patterns for permanent magnet machine rotors.

BACKGROUND

Hybrid-electric and electric vehicles utilize one or more electric machines to provide propulsion for the vehicle. A variety of electric machine technologies are available for such applications. Permanent magnet machines are a typical choice for vehicle applications. The permanent magnet machine includes a stator and a rotor. The rotor is constructed with permanent magnets. Coils in the stator are energized to create an electromagnetic flux that interacts with electromagnetic flux created by the permanent magnets of the rotor. The interaction of the fluxes causes the rotor to rotate. Due to various motor design characteristics, the interacting electromagnetic fluxes create a torque that is comprised of harmonic components. The torque may be described as a summation of components having different frequencies. This is observed as a ripple or oscillation in the torque.

SUMMARY

According to one embodiment of this disclosure, a permanent magnet machine is provided. The permanent magnet machine may include a plurality of laminations stacked to form a rotor. Each of the laminations may define a d-axis, and first and second, recessed notches on an outer circumference. The first and second recessed notches may be disposed at ±180/N electrical degrees with respect to the d-axis. N may be a multiple of 6.

According to another embodiment of this disclosure, an electric machine is provided. The electric machine may include a plurality of laminations stacked to form a rotor. Each of the laminations may define a d-axis, and first and second apertures. The first and second apertures may be disposed at ±180/N electrical degrees with respect to the d-axis. N may be a multiple of 6 to reduce back-electromagnetic flux of N−1 harmonic order.

According to yet another embodiment of this disclosure, an electric machine is provided. The electric machine may include a plurality of laminations stacked to form a rotor. Each of the laminations may define a d-axis and a first recessed notch on an outer circumference. The first recessed notch may include a pair of serrations. The first recessed notch may be aligned with the d-axis and configured to reduce back-electromagnetic flux of N+1 harmonic order.

BRIEF DESCRIPTION OF THE DRAWINGS

FIG. 7 is a partial plan view of a rotor including trapezoidal apertures disposed within the rotor.

FIG. 8 is a partial plan view of a rotor including triangular apertures and a peripheral groove disposed within the rotor.

DETAILED DESCRIPTION

Figure 1:
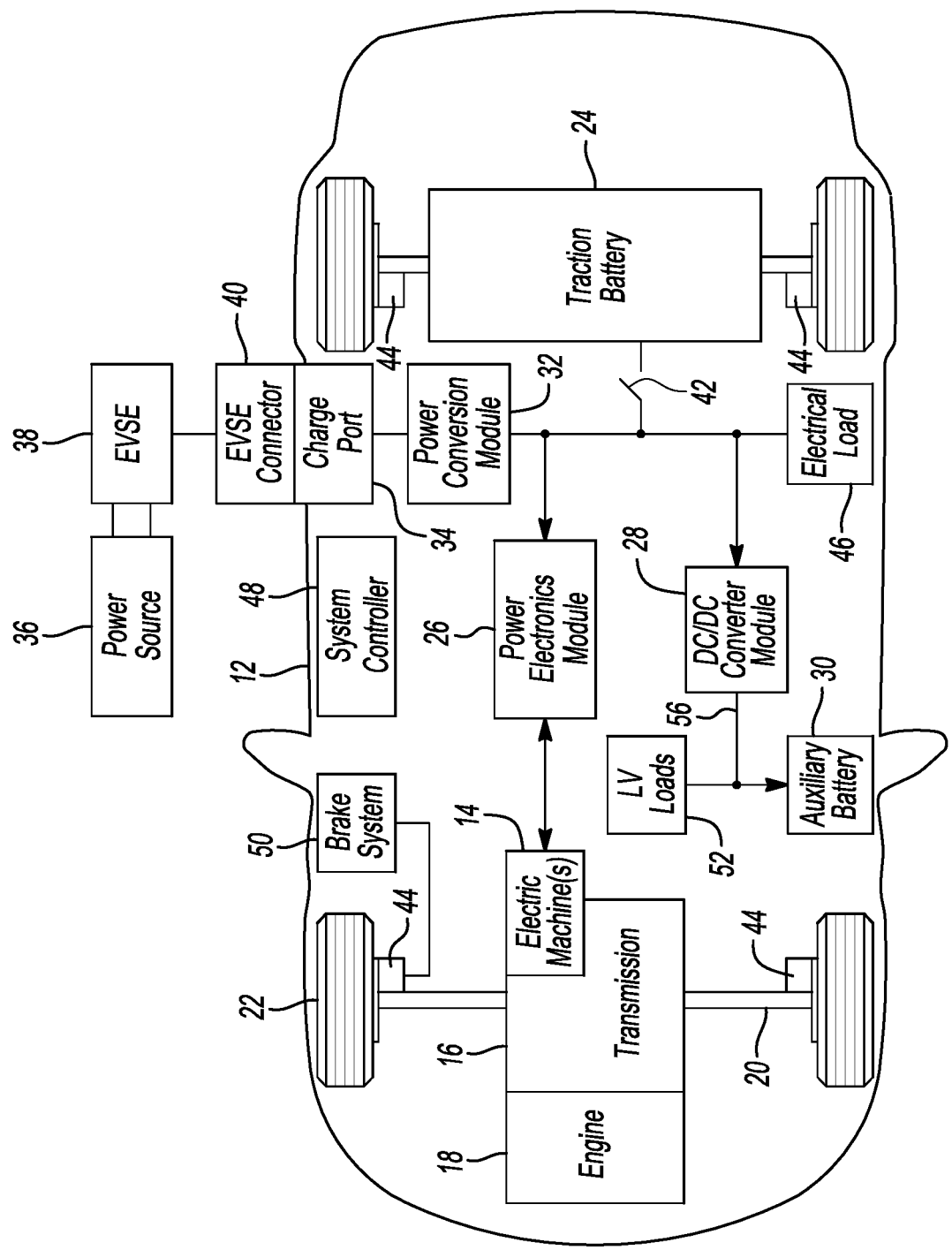
FIG. 1 is a diagram of a hybrid vehicle illustrating typical drivetrain and energy storage components including an electric machine.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Permanent magnet machines feature magnets mounted on or embedded within a rotor surrounded by a stator. The magnets mounted on or embedded in the rotor couple with the motor's current-induced, internal magnetic fields generated by electrical input to the stator. Similar to other alternating current (AC) induction motors, electrical power is supplied through the stator windings.

Separate groups of stator teeth and the stator windings form multiple magnetic poles that produce a flux flow pattern when the stator coils are energized with a multiphase sinusoidal voltage. A three-phase electric machine, for example, would have a total of 8 poles and 48 slots. A group of 6 slots would be characteristic of each pole of the particular examples of a 48 slot electric machine herein disclosed. The magnetic flux created by the stator windings interacts with rotor flux created by the permanent magnets in a rotor of a permanent magnet machine, so that a rotor torque is created as the stator windings are excited with a multi-phase voltage.

Permanent magnets of the rotor may be positioned or oriented in different ways to generate desirable magnetic fields. Each of the poles may be formed by a single permanent magnet oriented with one pole (i.e., north or south) in the radially outward direction. The poles of the rotor may be formed by groups of permanent magnets arranged to cooperatively form magnetic poles. One such arrangement orients the magnets in a V-shaped pattern. The internal portion of the "V" has similar magnetic poles that cooperate to form a magnetic pole of the rotor. Each of the permanent magnets may be disposed in pockets or cavities to retain the permanent magnets. These pockets or cavities are typically rectangular and sized to receive the permanent magnets. The cavities may be slightly oversized at opposite ends to limit magnetic flux leakage between north and south poles of the individual permanent magnets. Voids or cavities in the rotor core impede magnetic flux because a vacuum has a relatively low magnetic permeability compared to the rotor core material (e.g., electric steel).

The torque created by the stator windings and the rotor flux field develops a uniform torque component and a varying torque component. The total output torque of the electric machine is a combination of both components. Because of the variable torque component, a torque ripple phenomenon is created, which results in motor torque output speed oscillations when the electric machine is acting as a motor. Torque ripple in electric motors is caused by the interaction between the harmonic magnetic fluxes produced by the permanent magnets and the current in the stator winding. Reduction in the harmonic flux produced by the permanent magnet will lead to a reduction in the torque ripple as well as the iron loss.

For most applications, the torque ripple needs to be reduced to a manageable level, particularly in the case of hybrid electric vehicle powertrain applications where the torque ripple components occur at variable frequencies proportional to the output shaft speed of an electric traction motor. Higher order of frequencies usually can be filtered out by a limited bandwidth in the mechanical components of the powertrain. Lower frequencies, however, give rise to mechanical oscillations that cannot readily be filtered. Such oscillations are not acceptable in a hybrid electric vehicle powertrain. Presence of torque ripples from the motor at the lower frequencies may cause the motor to produce undesirable vibration and noise.

In general, rotor laminations may have pockets or cavities arranged around the periphery of the rotor to house permanent magnets. The permanent magnets may be situated to interact with the magnetic field generated by the stator windings. These pockets or cavities may include flux-limiting areas to minimize undesired flux leakage between magnets.

Referring to FIG. 1 a typical plug-in hybrid-electric vehicle (PHEV) is illustrated. A PHEV 12 may comprise one or more electric machines 14 mechanically coupled to a hybrid transmission 16. The electric machines 14 may be capable of operating as a motor or a generator. In addition, the hybrid transmission 16 is mechanically coupled to an engine 18. The hybrid transmission 16 is also mechanically coupled to a drive shaft 20 that is mechanically coupled to the wheels 22. The electric machines 14 can provide propulsion and deceleration capability when the engine 18 is turned on or off. The electric machines 14 also act as generators and can provide fuel economy benefits by recovering energy that would normally be lost as heat in a friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery or battery pack 24 stores energy that can be used by the electric machines 14. A vehicle battery pack 24 typically provides a high-voltage direct current (DC) output. One or more contactors 42 may isolate the traction battery 24 from a high-voltage bus when opened and couple the traction battery 24 to the high-voltage bus when closed. The traction battery 24 is electrically coupled to one or more power electronics modules 26 via the high-voltage bus. The power electronics module 26 is also electrically coupled to the electric machines 14 and provides the ability to bi-directionally transfer energy between high-voltage bus and the electric machines 14. For example, a traction battery 24 may provide a DC voltage while the electric machines 14 may operate with a three-phase alternating current (AC) to function. The power electronics module 26 may convert the DC voltage to a three-phase AC current to operate the electric machines 14. In a regenerative mode, the power electronics module 26 may convert the three-phase AC current from the electric machines 14 acting as generators to the DC voltage compatible with the traction battery 24. The description herein is equally applicable to a pure electric vehicle. For a pure electric vehicle, the hybrid transmission 16 may be a gear box connected to an electric machine 14 and the engine 18 may not be present.

Figure 2A:
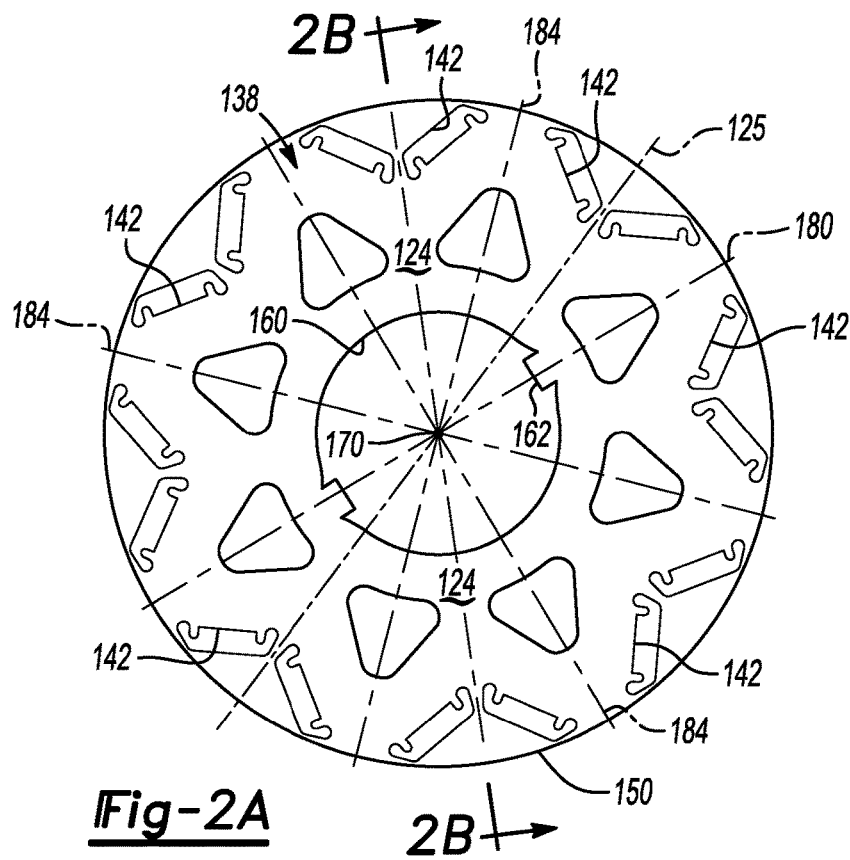
FIG. 2A is an example of a plan view of a rotor lamination.
Figure 2B:
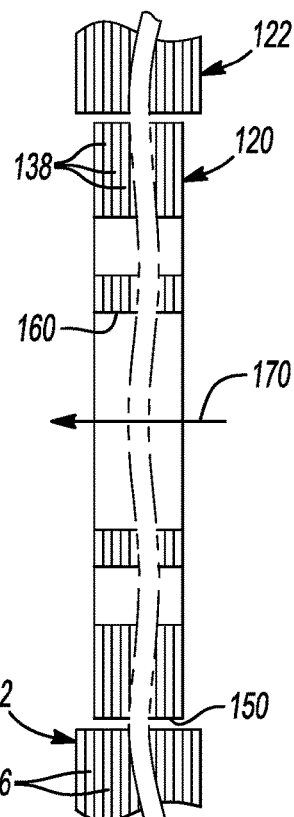
FIG. 2B is a cross-sectional view taken along the line 2B in FIG. 2A

The electric machines 14 may be Interior Permanent Magnet (IPM) machines that include a stator 122 and a rotor 120. FIG. 2A depicts an example rotor lamination 138 and FIG. 2B depicts a side view of a stator 122 and rotor 120 configurations having multiple rotor laminations 138 and multiple stator laminations 136 arranged in an axially stacked relationship. The rotor laminations 138 may define a circular central opening 160 for accommodating a drive shaft with a keyway that may receive a drive key 162. The rotor laminations 138 may define a plurality of magnet openings 142 that are symmetrically disposed with respect to adjacent pairs of magnet openings 142.

A plurality of rotor sectors 124 corresponding to poles of the rotor may be defined by a plurality of inter-polar axes (e.g., 180, 184) emanating from a central axis 170 of rotation to an outer surface 150 of the rotor lamination 138. Each of the sectors 124 may include a pair of magnet openings 142. The inter-polar axes (e.g., 180, 184) may be positioned to be midway between adjacent magnet openings 142. Note that FIG. 2A only shows two of the possible inter-polar axes 180, 184 and does not show all possible inter-polar axes. FIG. 2B depicts a cross-sectional view taken along the line 2-B in FIG. 2A of a series of axially stacked rotor laminations 138. The rotor laminations are stacked along the central axis 170 about which the rotor 120 is configured to rotate. A stator 122 surrounds the outer periphery or surface 150 of the rotor laminations 138.

Figure 3:
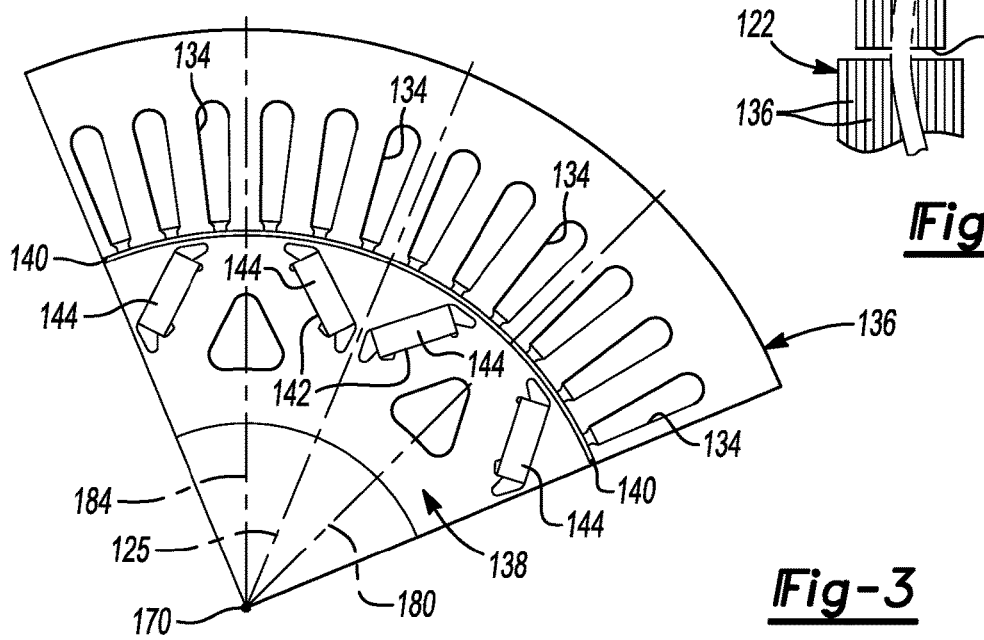
FIG. 3 is a partial plan view of an example rotor and stator.

Referring to FIG. 3, a partial plan view of a stator lamination 136 and a partial rotor lamination 138 are illustrated. The rotor laminations 138 and the stator laminations 136 may be comprised of a ferrous alloy. A small air gap 140 is located between the inner periphery of the stator laminations 136 and the outer periphery 150 of the rotor laminations 138. The stator laminations 136 may define radially extending openings 134.

The rotor laminations 138 may define symmetrically positioned magnet openings 142 near the outer periphery 150 of each rotor lamination 138. Each magnet opening 142 may be configured to receive a magnet 144. Any number of laminations in a given design may be used, depending on design choice. The rotor laminations 138 and the stator laminations 136 may be arranged in a stack along the axis 170 of rotation. The axially stacked rotor laminations 138 and the magnets 144 may define a plurality of magnetic poles, e.g., 180, 125, and 184 distributed about the axis 170.

The laminations 136 of the stator 122 may have conductors disposed in the radially extending openings 134 to form windings. The stator 122 may be comprised of an iron core made of a stack of stator laminations 136 and a winding arrangement for conductors that carry an excitation current. Current flowing through the stator winding generates a stator electromagnetic flux. The stator flux may be controlled by adjusting the magnitude and frequency of the current flowing through the stator windings. Because the stator windings are contained in openings 134 rather than a uniform sinusoidal distribution along the inner circumference of the stator, there may be harmonic fluxes in the stator flux.

The rotor 120 may be comprised of an iron core made of a stack of rotor laminations 138 and sets of permanent magnets 144 inserted within holes or cavities 142 that are defined by the iron core. The permanent magnets 144 in the rotor 120 may generate a rotor electromagnetic flux. The rotor flux may include harmonic fluxes due to shapes and sizes of the discrete permanent magnets. The stator flux and the rotor flux may be distributed in the air-gap 140. Interaction between the stator flux and the rotor flux causes the rotor 120 to rotate about the axis 170.

Poles of the rotor 120 may be geometrically defined to correspond to the sectors 124 defined by the rotor laminations 138. Each of the poles may be represented by a sector 124. A pole location may be generally defined by a center-pole axis 125 that extends radially from the axis 170 toward the outer surface 150 of the rotor 138 along a midpoint between adjacent magnet openings 142. The inter-polar axes (e.g., 180, 184) may extend radially from the axis 170 toward the outer surface 150 of the rotor 138 between adjacent poles. An angular distance between two adjacent poles may define a pole pitch parameter. The arc length on the circumferential rotor surface 150 between two adjacent poles of the rotor may be referred to as the pole pitch. The pole pitch may be measured circumferentially around the outer rotor surface 150 between adjacent center-pole axes 125. Each pole may have an associated surface area on the outer circumferential surface 150 of the rotor 120. Each pole may be represented by the arc length on the surface between adjacent inter-polar axes 180, 184.

An electromagnetic field or signal may be composed of a summation of harmonic components having different frequencies and magnitudes. Each harmonic component may be represented as a frequency and a magnitude. The signal may include a fundamental component. The fundamental component may be the frequency component having the greatest magnitude.

During operation, the stator and rotor fundamental component fluxes may align and rotate in the same direction at the same frequency. The interaction between the fundamental component of the stator flux and the rotor flux generates a torque. The stator and rotor harmonic fluxes may have different pole numbers, rotation speeds and directions. As a result, the interaction between the harmonic fluxes generates torque fluctuations, referred to as torque ripple. The torque ripple may have harmonic components having different frequencies. The order of a torque ripple component may be defined as the ratio of the frequency of the torque ripple component to the speed of the rotor in revolutions per second.

One effect of the torque ripple is that it may cause speed oscillations of the rotor. Further, the torque ripple may impact noise and vibration of the motor and components coupled to the electric machine. Higher order torque ripple frequencies may be filtered out by the limited bandwidth of the coupled mechanical system. Lower harmonic frequencies of the torque ripple may give rise to mechanical oscillations in the coupled system. It is desirable to reduce the torque ripple to reduce vibration and noise in systems that incorporate electric machines.

Figure 4A:
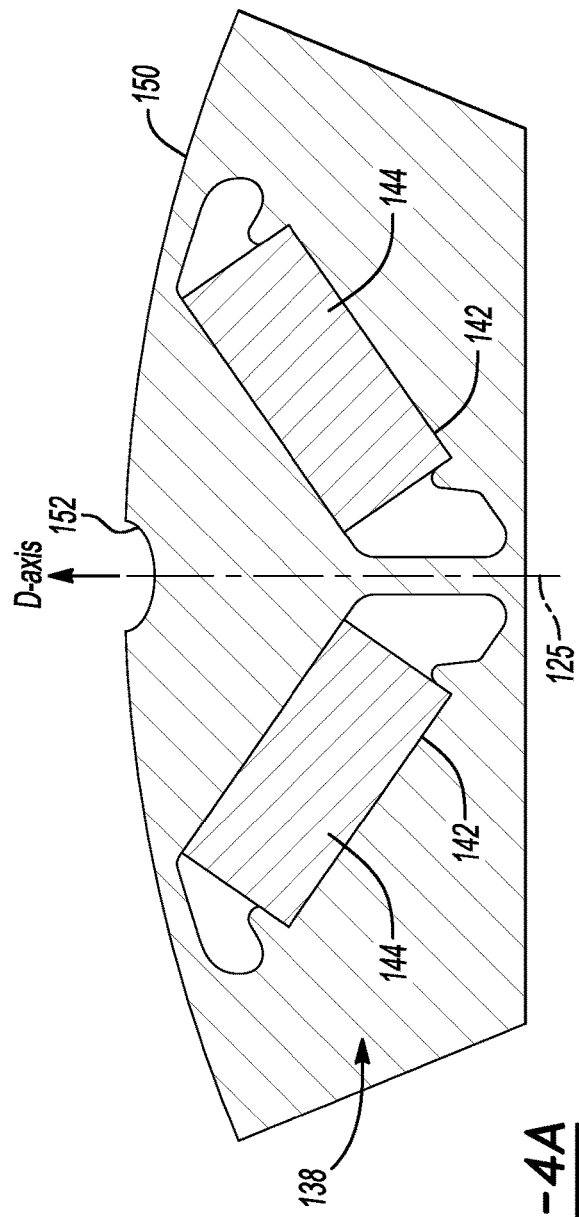
FIG. 4A is a partial plan view of a prior-art rotor including a peripheral groove.

Referring to FIG. 4A, a partial plan view of a prior art rotor is illustrated. Generally, the outer circumferential surface 150 of the rotor 120 is rounded or smooth. Here the rotor includes a recessed notch or groove 152 disposed about the d-axis 125 of the rotor.

Figure 4B:
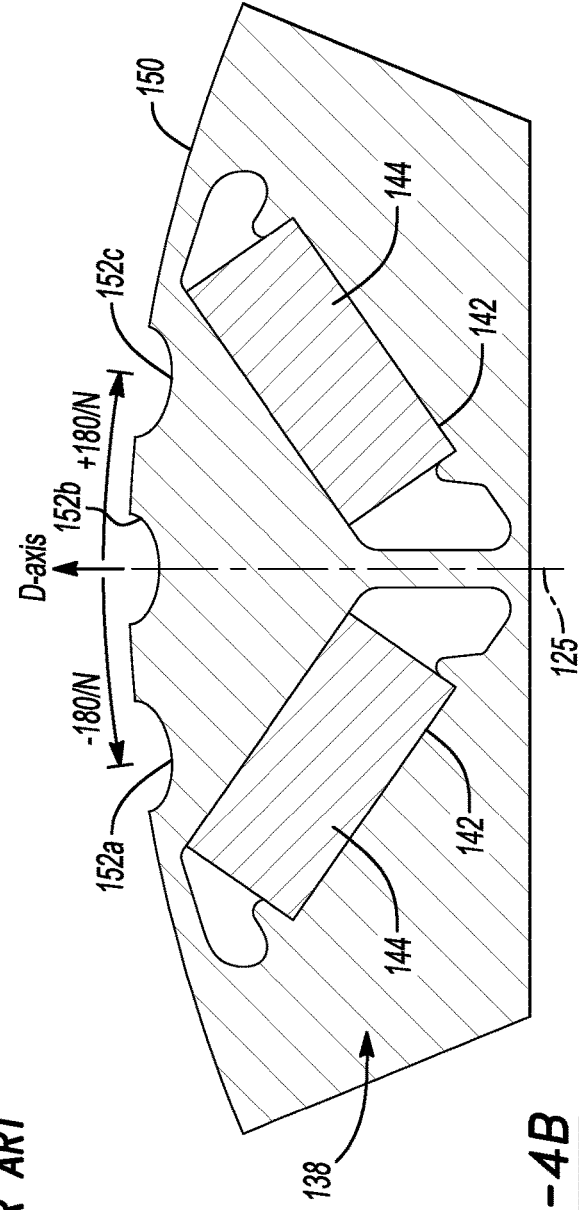
FIG. 4B is a partial plan view of a rotor including more than one peripheral groove.

Referring to FIG. 4B, a partial plan view of a rotor according to at least one embodiment of this disclosure is illustrated. Rather than a single groove 152 centered to the d-axis 125, this embodiment includes three grooves. The first groove 152a is positioned along an angle of −180/N electrical degrees, where N is an integer of multiple of 6, e.g., 6, 12, 18, etc. The second groove 152b is centered on the d-axis 125. Similar to the first groove, the third groove 152c is positioned along an angle of 180/N electrical degrees with respect to the d-axis, where N is a multiple of 6, e.g., 6, 12, 18, etc. The integer N may represent or correlate to the electric order of torque ripple. The grooves and their specified positions are configured to reduce back-electromagnetic force (back-EMF).

Back-EMF is the voltage of stator winding induced by the magnetic field generated by rotating the rotor. The back-EMF harmonics contribute to current harmonics and motor loss that may be detrimental to the efficiency of the motor. The torque ripple may also increase due to the back-EMF harmonics. Back-EMF may be reduced to achieve a reduction in torque ripple in the motor system and an increase in efficiency of the motor. The rotor magnetic field along the rotor periphery may not be distributed sinusoidally and may contain harmonics in the order of N±1. The rotor magnetic field harmonics will induce the back-EMF harmonics in the same order. The detrimental back-EMF harmonics are in the order of N±1, where N is an integer of 6, e.g., 6, 12, 18, etc. The back-EMF may be improved by positioning the various features, as shown in FIG. 4B and as will be described below, along predetermined angles with respect to the d-axis.

Figure 5:
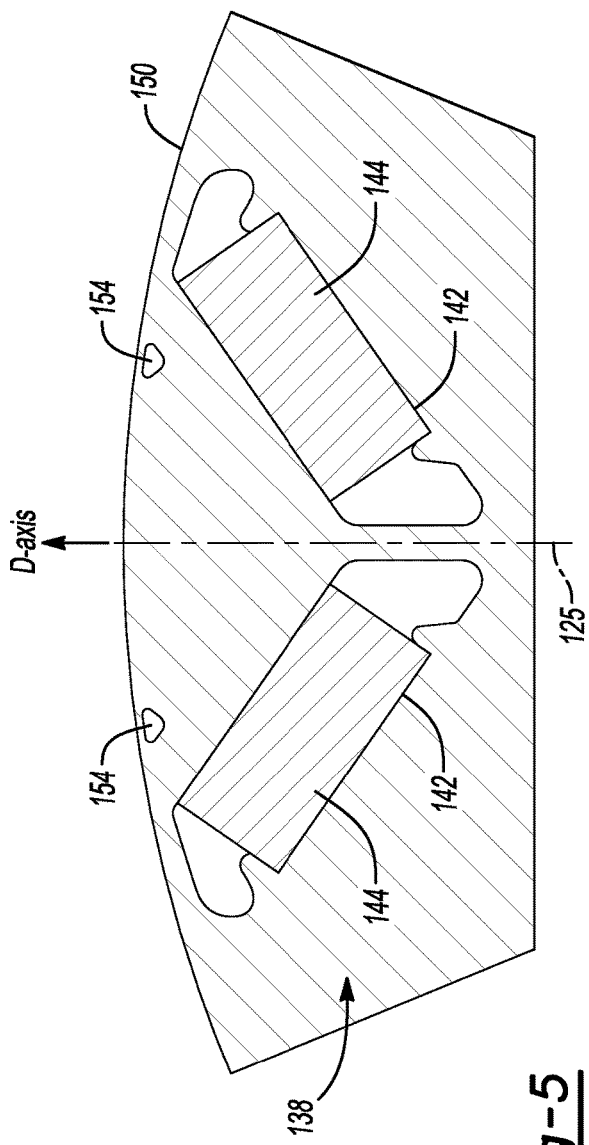
FIG. 5 is a partial plan view of a rotor including triangular apertures disposed within the rotor.
Figure 6:
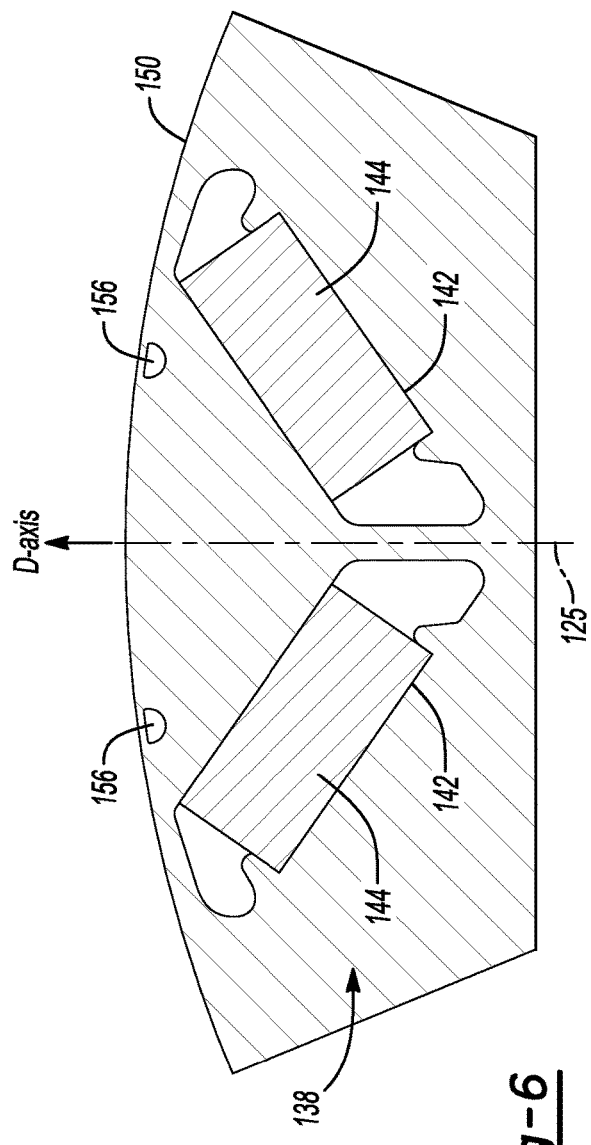
FIG. 6 is a partial plan view of a rotor including semi-circular apertures disposed within the rotor.

Referring to FIG. 5, a partial plan view of a rotor according to another embodiment of this disclosure is illustrated. Two triangular holes or slots 154 may be positioned between the magnet cavities 142 and proximal to the edge of the rotor 150. More specifically, the triangular holes 154 are positioned along an angle of −180/N electrical degrees and +180/N electrical degrees with respect to the d-axis. The effect of the triangular slots 154 is to reduce back-EMF harmonics in the order of N−1. Referring specifically to FIG. 6, the rotor 138 includes semi-circular slots 156 that are arranged in the same position as the triangular slots 154 in FIG. 5. The semi-circular slots 156 also reduce back-EMF harmonics in the order of N−1. Referring specifically to FIG. 7, the rotor 138 includes trapezoidal slots 158 or apertures that are arranged in the same position as the triangular slots 154 in FIG. 5. As with the triangular slots 154 and the semi-circular slots 156, the trapezoidal slots reduce back-EMF harmonics in the order of N−1.

Figure 9:
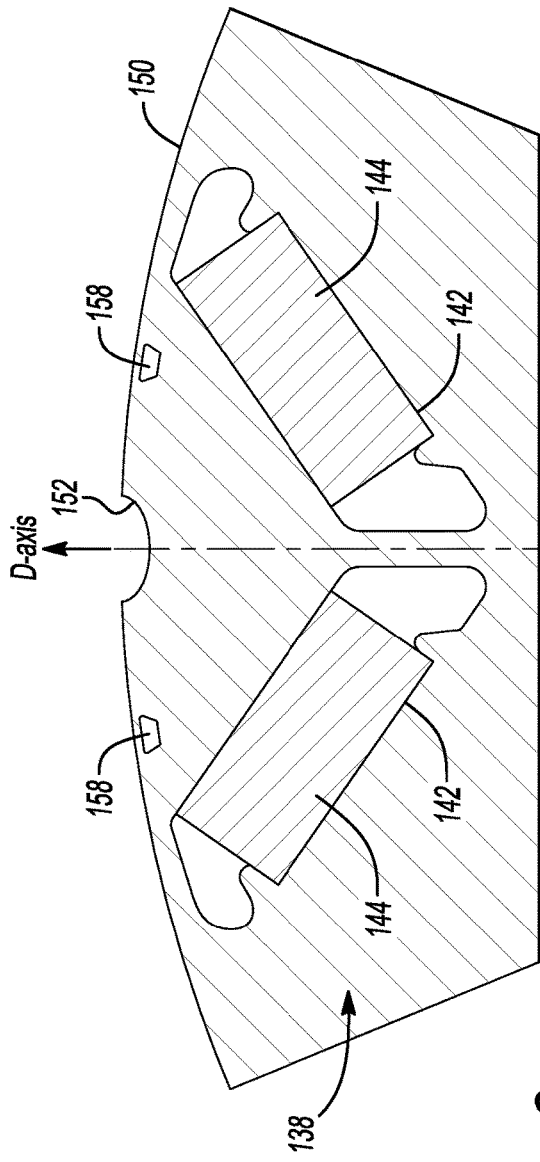
FIG. 9 is a partial plan view of a rotor including trapezoidal apertures and a peripheral groove disposed within the rotor.
Figure 10:
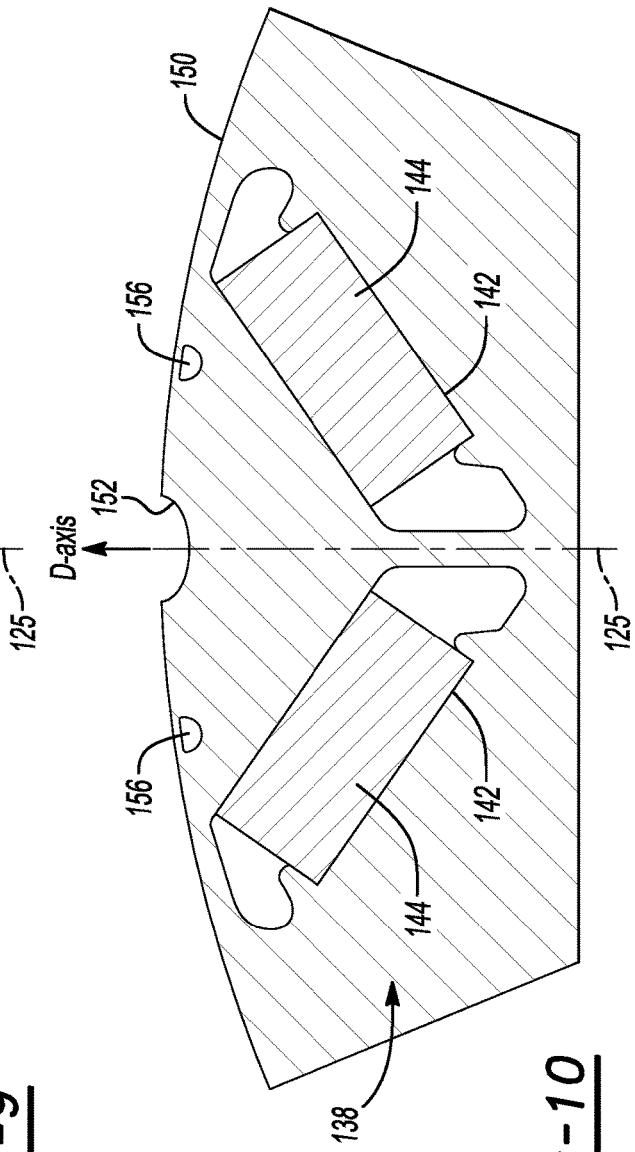
FIG. 10 is a partial plan view of a rotor including semi-circular apertures and a peripheral groove disposed within the rotor.

Referring to FIG. 8, a partial plan view of a rotor according to another embodiment of this disclosure is illustrated. The rotor 138 combines the features of the single peripheral groove 152, illustrated by FIG. 4A, and the triangular holes or slots 154. The single peripheral groove 152 is aligned with the d-axis 125 and is configured to reduce back-EMF harmonics in the order of N+1 The triangular slots 154 are positioned relative to the d-axis 125 at an angle of −180/N electrical degrees and +180/N electrical degrees. FIG. 9 illustrates a partial plan view of a rotor 138 that includes a single peripheral groove 152, arranged about the d-axis and two trapezoidal slots 158 each positioned relative to the d-axis 125 at an angle of −180/N electrical degrees and +180/N electrical degrees. FIG. 10, illustrates the single peripheral groove concept already mentioned above and the semi-circular slots 156. The trapezoidal slots 158 and semi-circular slots 156 are each configured to reduce back-EMF harmonics in the order of N−1.

Figure 11:
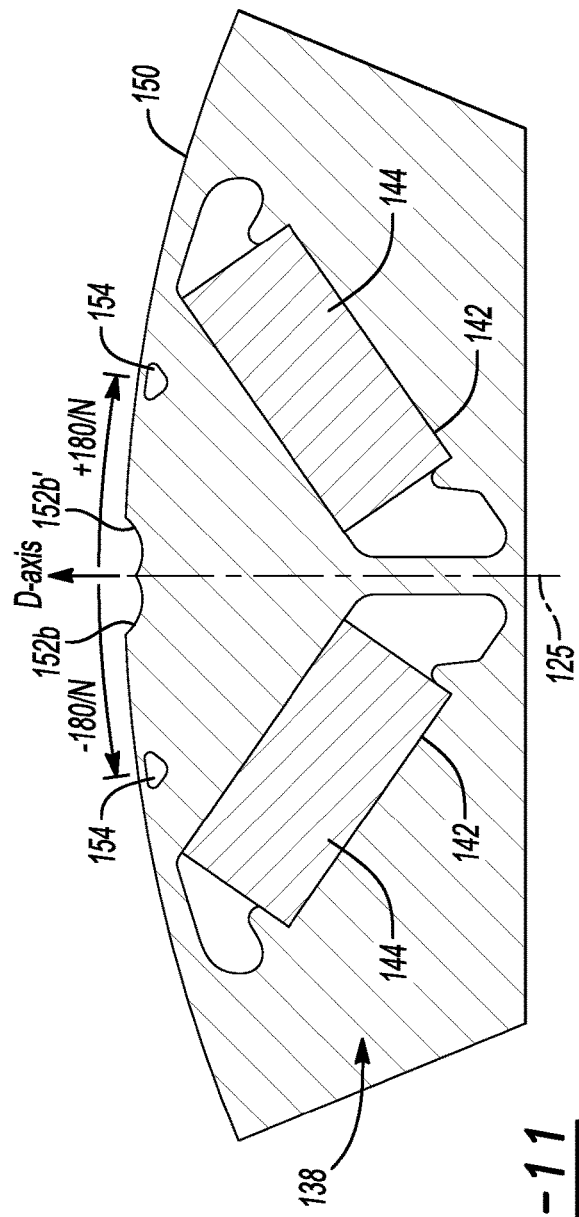
FIG. 11 is a partial plan view of a rotor including a double semi-circular peripheral groove defined by the rotor.

Referring to FIG. 11, a partial plan view of a rotor according to another embodiment of this disclosure is illustrated. The rotor 138 may include a pair of serrations or grooves 152*b* and 152*b'* that intersect one another and are bisected by the d-axis 125. The two grooves or serrations that bisect one another may be referred to as a "double groove" and offers the advantage of reducing the back-EMF harmonics in the order of N+1. A serration may be defined as having a jagged edge or saw-like feature. In addition to the pair of serrations 152*b* 152*b'*, triangular slots 154 described in the previous figures are implemented. Note the slots may be triangular, trapezoidal, or semi-circular as already described. The triangular slots 154 and the semi-circular slots 156, the trapezoidal slots reduce back-EMF harmonics in the order of N−1.

Figure 12:
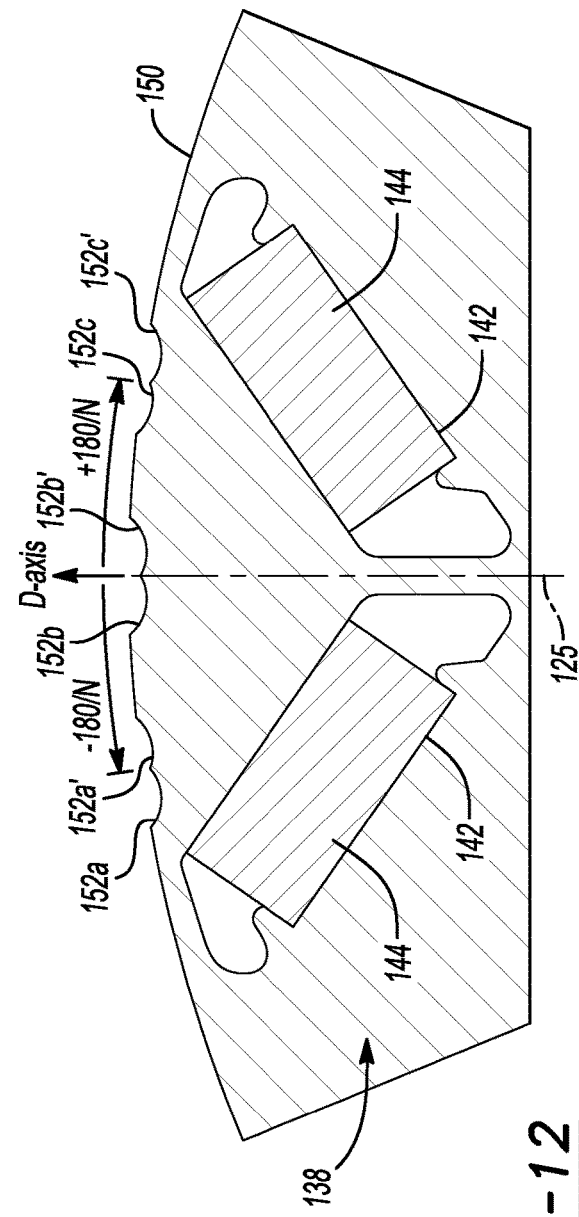
FIG. 12 is a partial plan view of a rotor including more than one double semi-circular peripheral grooves defined by the rotor.

The double groove or serrated edge concept is expounded up on in FIG. 12. Here, the double grooves or serrations are bisected by the d-axis with grooves or serrations 152*b* and 152*b'* on each side of the d-axis. Slots 152*a* and 152*a'* are positioned at −180/N electrical degrees and slots 152*c* and 152*c'* are positioned at. The double grooves 152*b* and 152*b'* reduce back-EMF harmonics in the order of N+1. The grooves 152*a*, 152*a'*, 152*c*, and 152*c'* reduce the back-EMF harmonics in the order of N−1.

What is claimed is:

1. A permanent magnet machine comprising:
   a plurality of laminations stacked to form a rotor, each of the laminations defining a d-axis, and first and second recessed notches on an outer circumference disposed at ±180/N electrical degrees with respect to the d-axis, wherein N is a multiple of 6.

2. The permanent magnet machine of claim 1, wherein the first and second recessed notches include a pair of serrations.

3. The permanent magnet machine of claim 1, wherein each of the laminations further defines a third recessed notch on the outer circumference and disposed on the d-axis.

4. The permanent magnet machine of claim 3, wherein the first, second, and third recessed notches are each positioned between a pair of magnets.

5. The permanent magnet machine of claim 4, wherein the pair of magnets are arranged in a V-Shape.

6. The permanent magnet machine of claim 3, wherein the first, second, and third recessed notches are curved.

7. The permanent magnet machine of claim 3, wherein each of the first, second, and third recessed notches are elliptically shaped.

8. A permanent magnet machine comprising:
   a plurality of laminations stacked to form a rotor, each of the laminations defining a d-axis, and first, second, and third recessed notches on an outer circumference disposed at ±180/N electrical degrees with respect to the d-axis, wherein N is a multiple of 6.

9. The permanent magnet machine of claim 8, wherein the third recessed notch is disposed on the d-axis.

* * * * *